(12) United States Patent
Khawer et al.

(10) Patent No.: US 12,302,116 B2
(45) Date of Patent: May 13, 2025

(54) PRIVATE CELLULAR ENTERPRISE NETWORK DEPLOYMENT WITH ENHANCED DATA SECURITY FOR INFRASTRUCTURES SUCH AS FORTRESSES WITH THICK CONCRETE WALLS

(71) Applicant: Nokia Solutions and Networks Oy, Espoo (FI)

(72) Inventors: Mohammad Khawer, Wayland, MA (US); Shkumbin Hamiti, Helsinki (FI); Stephan Litjens, Helsinki (FI); Frank Shelton, Keller, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 293 days.

(21) Appl. No.: 17/780,273

(22) PCT Filed: Dec. 9, 2020

(86) PCT No.: PCT/US2020/063885
§ 371 (c)(1),
(2) Date: May 26, 2022

(87) PCT Pub. No.: WO2021/119051
PCT Pub. Date: Jun. 17, 2021

(65) Prior Publication Data
US 2022/0417761 A1    Dec. 29, 2022

Related U.S. Application Data

(60) Provisional application No. 62/945,618, filed on Dec. 9, 2019.

(51) Int. Cl.
*H04W 16/14* (2009.01)
*H04W 24/02* (2009.01)

(52) U.S. Cl.
CPC .......... *H04W 16/14* (2013.01); *H04W 24/02* (2013.01)

(58) Field of Classification Search
None
See application file for complete search history.

(56) References Cited

U.S. PATENT DOCUMENTS

| 10,932,138 B2 * | 2/2021 | MacMullan | .......... H04W 16/14 |
| 2019/0028182 A1 * | 1/2019 | Smyth | .................... H04W 24/08 |

(Continued)

FOREIGN PATENT DOCUMENTS

| WO | 2019/226173 A1 | 11/2019 |

OTHER PUBLICATIONS

Decision of Final Rejection received for corresponding Japanese Patent Application No. 2022-535150, dated Nov. 30, 2023, 2 pages of Decision of Final Rejection and 2 pages of translation available.

(Continued)

*Primary Examiner* — Kenneth B Wells
(74) *Attorney, Agent, or Firm* — Nokia Solutions and Networks Oy

(57) ABSTRACT

A spectrum access system (SAS) includes a transceiver that receives information indicating a path loss from an interior location to an exterior location in response to a base station being installed at the interior location. The SAS also includes a processor to determine an aggregate interference level for an incumbent proximate the exterior location based on the path loss. An edge router executes instances of a packet core network. The edge router instantiates containers for a connectivity or digital automation enabler and routes customer network traffic without leaving the customer network. A domain proxy receives a request to allocate carriers to a base station and determines whether a frequency separation between the carriers is larger than a bandwidth allocated to an incumbent. The request is rejected if the frequency separation is less than the bandwidth and granted if the frequency separation is greater than or equal to the bandwidth.

12 Claims, 14 Drawing Sheets

(56) References Cited

U.S. PATENT DOCUMENTS

2019/0215058 A1\* 7/2019 Smyth ................ H04B 7/18502
2020/0053669 A1\* 2/2020 Hannan ............... H04W 52/243

OTHER PUBLICATIONS

Office action received for corresponding Japanese Patent Application No. 2022-535150, dated Jul. 27, 2023, 4 pages of office action and 5 pages of translation available.

"Requirements for Commercial Operation in the U.S. 3550-3700 MHz Citizens Broadband Radio Service Band", Wireless Innovation Forum, Working Document WINNF-TS-0112 Version V1.4.1, Jan. 16, 2018, 77 pages.

International Search Report and Written Opinion received for corresponding Patent Cooperation Treaty Application No. PCT/US2020/063885, dated May 18, 2021, 17 pages.

Kryszkiewicz et al., "Context-based spectrum sharing in 5G wireless networks based on Radio Environment Maps", Wireless Communications and Mobile Computing, Hindawi, vol. 2018, Nov. 2018, pp. 1-15.

"Second Report and Order, Second Further Notice of Proposed Rulemaking, Order on Reconsideration, and Memorandum Opinion and Order", Federal Communications Commission, FCC 17-152, 2017, pp. 1-139.

\* cited by examiner

PRIVATE CELLULAR ENTERPRISE NETWORK DEPLOYMENT WITH ENHANCED DATA SECURITY FOR INFRASTRUCTURES SUCH AS FORTRESSES WITH THICK CONCRETE WALLS

RELATED APPLICATION

This application claims priority to PCT Application No. PCT/US2020/063885, filed on Dec. 9, 2020, which claims priority to U.S. Provisional Application No. 62/945,618, filed on Dec. 9, 2019, each of which is incorporated herein by reference in its entirety.

BACKGROUND

Spectrum is the most precious commodity in deploying wireless networks such as a private enterprise network. Cellular communication systems, such as networks that provide wireless connectivity using Long Term Evolution (LTE) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication systems such as LTE networks. The 3.1-4.2 GHz spectrum is occupied by incumbents such as Fixed Satellite System (FSS) and federal incumbents such as U.S. government or military entities. For example, the 3550-3700 MHz frequency band (CBRS band) was previously reserved for exclusive use by incumbents including the United States Navy and FSS earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a spectrum access system (SAS) is provided. The SAS includes a transceiver configured to receive information indicating a path loss from an interior location of a structure to an exterior location in response to the first base station being installed at the interior location. The SAS also includes a processor configured to determine an aggregate interference level for an incumbent proximate the exterior location based on the path loss and to allocate at least one channel to the first base station based on the aggregate interference level.

In some embodiments, the information indicating the path loss is determined based on an observed signal strength at the exterior location concurrently with the transceiver transmitting at a maximum permitted power level.

In some embodiments, the maximum permitted power level is higher than a maximum permitted indoor power level that assumes a default path loss that is less than the path loss determined based on the observed signal strength at the exterior location.

In some embodiments, the maximum permitted power level is 30 dBm and the default path loss is 15 dBm.

In some embodiments, the transceiver is configured to provide wireless connectivity to the interior of the structure at up to the maximum permitted power level.

In some embodiments, the first base station implements a contention-based media access control (MAC) layer to provide wireless connectivity to the interior of the structure.

In some embodiments, the processor is configured to allocate two carriers that are separated by a predetermined bandwidth associated with the incumbent so that the presence of the incumbent does not disable both carriers.

In some embodiments, the transceiver is configured to receive a request to allocate the two carriers, and wherein the processor is configured to selectively grant the request based on a comparison of a bandwidth between the two carriers and the predetermined bandwidth.

In some embodiments, a method is provided including configuring an edge router to execute at least one instance of a packet core network. The edge router is implemented in a customer network. The method also includes instantiating containers for at least one connectivity or digital automation enabler and routing customer network traffic via the packet core network without leaving the customer network.

Some embodiments of the method include configuring the edge router to provide data security and isolation.

In some embodiments, data associated with the customer network traffic remains localized to the edge router.

In some embodiments, the edge router is configured for installation at an interior location of a structure, and wherein a spectrum access system (SAS) allocates at least one channel to the edge router based on a path loss between the interior location and an exterior location in response to the edge router being installed at the interior location.

Some embodiments of the method include transmitting a request for allocation of two carriers that are separated by a first bandwidth.

Some embodiments of the method include receiving information from the SAS granting the request in response to the first bandwidth being greater than or equal to a predetermined bandwidth associated with an incumbent so that the presence of the incumbent does not disable both carriers.

In some embodiments, an apparatus is provided that includes at least one processor; and at least one memory including computer program code. The at least one memory and the computer program code are configured to, with the at least one processor, cause the apparatus at least to perform receiving information indicating a path loss from an interior location of a structure to an exterior location in response to the first base station being installed at the interior location, determining an aggregate interference level for an incumbent proximate the exterior location based on the path loss, and allocating at least one channel to the first base station based on the aggregate interference level.

In some embodiments, the information indicating the path loss is determined based on an observed signal strength at the exterior location concurrently with the transceiver transmitting at a maximum permitted power level.

In some embodiments, the maximum permitted power level is higher than a maximum permitted indoor power level that assumes a default path loss that is less than the path loss determined based on the observed signal strength at the exterior location.

In some embodiments, the at least one memory and the computer program code are configured to, with the at least one processor, cause the apparatus at least to perform providing wireless connectivity to the interior of the structure at up to the maximum permitted power level.

In some embodiments, the at least one memory and the computer program code are configured to, with the at least one processor, cause the apparatus at least to perform receiving a request to allocate at least two carriers to a base station associated with a spectrum access server and determining whether a frequency separation between the at least two carriers is larger than a bandwidth allocated to an incumbent.

In some embodiments, the at least one memory and the computer program code are configured to, with the at least one processor, cause the apparatus at least to perform rejecting the request if the frequency separation is less than the bandwidth and granting the request if the frequency separation is greater than or equal to the bandwidth.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
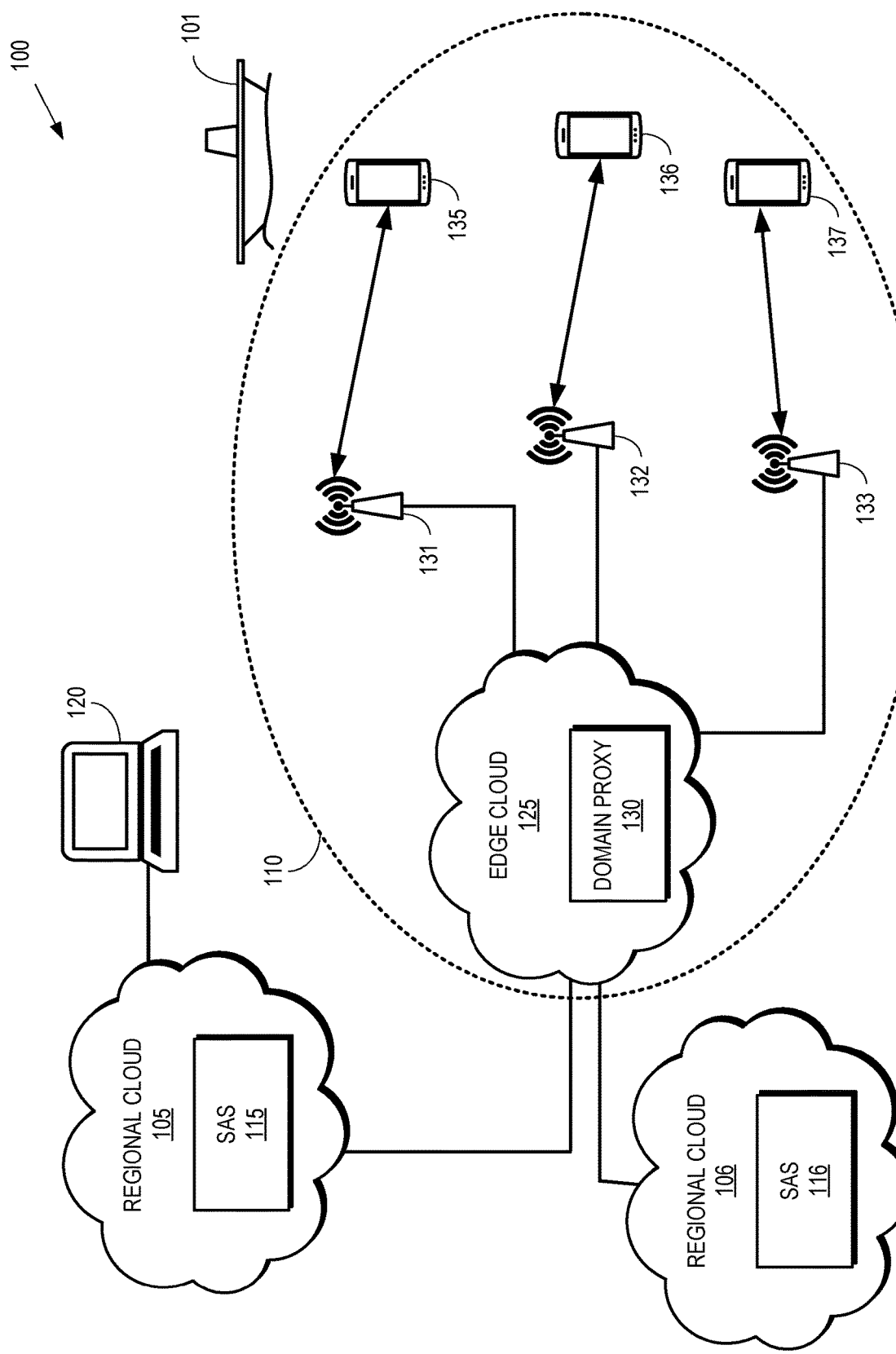
FIG. 1 is a block diagram of a communication system according to some embodiments.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more base stations, wireless devices, or wireless access devices such as Citizens Broadband radio Service Devices (CBSDs) consistent with 47 CFR § 96.33, et seq. Incumbents, PAL licensees, and GAA operators are required to request access from a spectrum access system (SAS), which allocates frequency bands to the operators, e.g., for CBRS within the 3550-3700 MHz band. The SAS is responsible for managing or controlling different types of CBSDs in the CBRS frequency bands.

In current deployments, the CBSD are categorized as:
Category A—CBSDs designed for indoor deployments with a maximum transmission power limit of 30 dBm,
Category B—CBSDs designed for outdoor deployments with a maximum transmission power limit of 47 dBm.
CPE—CBSDs designed for use as customer premises equipment.

The SAS allocates frequency bands to the CBSDs associated with the operators within particular geographical areas and, in some cases, during particular time intervals. The SAS determines whether incumbents are present within corresponding geographical areas using an environmental sensing capability (ESC) that performs incumbent detection, e.g., using radar to detect the presence of a Navy ship in a port.

The tiered access architecture provides priority access to incumbents, which include Grandfathered Wireless Broadband Licensees that are authorized to operate on a primary basis on frequencies designated in 47 CFR § 96.11. When an incumbent is present in a geographical area, the incumbent is granted exclusive access to a portion of the CBRS spectrum within the geographic area. For example, if a Navy ship enters a port, communication systems on the ship are granted exclusive access to a 20-40 MHz band within the 3550-3700 MHz band. Operators that have received a PAL and GAA operators are required to vacate the band allocated to the ship. A PAL license grants exclusive access to a portion of the 3550-3650 MHz band within a predetermined geographical area as long as no incumbents have been allocated an overlapping portion of the 3550-3700 MHz band within the predetermined geographical area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

The FCC and the National Telecommunications and Information Administration (NTIA) define protection areas that give priority to incumbents or other base stations or users. Examples of protection areas include, but are not limited to, areas associated with incumbents in a Fixed Satellite System (FSS), a grandfathered wireless protection zone (GWPZ), a region associated with a grandfathered wireless broadband license (GWBL), a region associated with a priority access license (PAL), a region associated with an ESC, and dynamic protection areas (DPAs).

The FCC and the NTIA also define a set of DPAs along the east, west, and Gulf coasts of the United States. A DPA is a pre-defined local protection area that is activated or deactivated as necessary to protect Department of Defense (DOD) radar systems. All outdoor (Category B) CBSD within an activated DPA are required to stop transmission or reduce transmission to below a threshold transmit power. One or more ESC sensors deployed within a DPA detect the presence or absence of an incumbent. In some cases, an ESC cloud gathers information from a set of ESC sensors within a DPA and uses this information to detect incumbents. An ESC sensor (or cloud) transmits a report to the SAS for the DPA in response to the ESC sensor (or cloud) detecting the presence of an incumbent. The report includes information identifying the portion (e.g., 10-20 MHz) of the total 150 MHz CBRS spectrum that is impacted by the presence of the incumbent. In response to receiving the report, the SAS performs interference management using all the CBSDs within the DPA that are operating within the impacted frequency range. For example, the SAS can move the CBSD to a different channel or instruct the CBSD to operate with a lower transmit power to keep the interference level in compliance with FCC regulations. Lowering the transmit power reduces the transmission coverage area for the CBSD. A DPA can only be deactivated by an operational ESC sensor. Thus, the SAS and the ESC sensor (or cloud) maintain a constant heartbeat exchange to verify that an operational ESC sensor is present within the DPA. If there are no operational ESC sensors deployed within a DPA, the DPA must be activated throughout the entire 150 MHz CBRS spectrum. Moreover, no outdoor CBSDs (Category B) can be deployed in a DPA without an ESC sensor.

Technicians are sent into the field to install CBSDs. For example, the FCC requires certified professional installers (CPI) to perform the installation of outdoor (Category B) CBSDs and indoor (Category A) CBSDs that are deployed outside at a height above 6 meters (m). The CPI is responsible for installing the CBSD and verifying that the CBSD is operating correctly by performing a series of tests including a power check to verify that the CBSD can power up, a registration check to verify that the CBSD successfully registered with the SAS, a grant check to verify that the CBSD received a grant from the SAS, a radio grant check to verify that the CBSD is authorized for communication on the granted channel, and a walk-through check to verify that user equipment are receiving data transmitted by the CBSD.

Private enterprise networks would like to use high-speed cellular access capabilities to support vertical market segments such as industrial automation in locations including nuclear power plants, prisons are fortresses in the Federal prison system, package delivery companies, windfarms, ports, mines, hospitals, and the like. High-speed cellular access typically offers more reliable and superior QoS in comparison to Wi-Fi networks. Until recently, such capabilities were not possible as the spectrum needed to run private cellular networks has been in the form of statically licensed spectrum owned by mobile network operators and could not be easily accessed on the sites of interest. With emergence of shared spectrum, where the spectrum owned and used by e.g., US Federal Entities, the issue of availability of spectrum for the vertical market segment is no longer a hurdle and the dependence on the licensed spectrum that is owned by the MNOs for deploying cellular network for private enterprises has been broken.

The CBRS band has thus opened-up the possibility of an innovation band for new small entrants such as the digital automation verticals to deploy their own private cellular (LTE/5G) Enterprise Network without any need to acquire the LTE/5G service from their regional wireless providers. Smaller entrants can therefore architect a private cellular (LTE/5G) enterprise network that meets their own specific mission critical needs for service and coverage. However, data isolation and security are critical requirements in some vertical market segments including the Federal prison system. Data remains localized/isolated within the premises of the private enterprise network and should not traverse the MNO/MSO core network. This requirement alone obviates the use of an MNO/MSO provided enterprise network deployments for such vertical market segment deployment as it is not private in terms of data isolation/security as all data traverse the MNO/MSO core network.

The thick concrete walls such as used in underground subterranean structures and fortresses pose serious performance and coverage challenges for a Wi-Fi based enterprise network deployment solution. Thick prison walls not only impede Wi-Fi signals that implement a contention based MAC layer and a much lower UL transmit power allowance on the UE side compared to the cellular (LTE/5G) technologies, but the need for ruggedized/robust radio units to be installed on prison walls due to prisoners' tendency to damage/scavenge components from indoor units makes deployment even more challenging using Wi-Fi with coverage holes and inferior QOS compared to cellular (4G/5G) private enterprise networks.

The availability of spectrum was the biggest impediment in deploying the cellular (LTE/5G) private enterprise networks. The availability of the shared spectrum as described below removed this impediment. However, unlike licensed spectrum, the channel in shared spectrum may be taken away at any given time due to the appearance of the incumbent. Switching the CBSDs from one channel to another may take up to 5-6 minutes of down time for the connected UEs.

All CBSDs operating in the shared spectrum are always under the direct control of the SAS that performs shared spectrum channel management, allocation, and incumbent protection. This is ensured by periodic heartbeat message exchanges between the operational CBSDs that are deployed on the edge cloud networks and the SAS that resides on the regional cloud. The periodicity of the heartbeat messages is tuneable, e.g., a heartbeat is exchanged every 20 seconds. If for any reason the connectivity between the SAS and the CBSD is lost (break in backhaul link, natural disaster in a geographic location where the SAS regional cloud datacentre is located, or SAS under DDOS (Distributed Denial of Service Attack) etc, for a period exceeding 240 seconds, under the rules defined for the use of the shared spectrum, the CBSDs have to immediately cease operation in the shared spectrum to protect the incumbents irrespective of whether any incumbents are present in the geographic vicinity of the deployed edge network in which the CBSD is operating. WIN NForum has defined the notion of Geo redundant SAS instances to tackle such a situation. In those scenarios if connectivity with the primary SAS is lost, the CBSDs of an edge cloud network may switch their connectivity to the secondary SAS that is hosted on a different geographic datacentre, and thus may not be impacted by any natural disaster or connectivity issues that the primary SAS may have been impacted with. However, doing this primary SAS to secondary SAS switching will incur a System down time of around 5-6 minutes.

FIGS. 1-12 disclose embodiments of a method and apparatus for a private cellular (4G/5G) enterprise network solution that uses the shared spectrum for vertical market segments involving subterranean structures and fortresses with thick concrete walls such as the federal prison system. Data isolation/security within the premises is ensured with far superior coverage and QOS that the current Wi-Fi based networks may offer, so that the inmates/prisoners may be allowed to use tablets in their cells to contact loved ones by video calling. Such a use case assists in rehabilitating the inmates by providing them with a mechanism to be in touch with their loved ones including their young children more often daily. In another embodiment, the network may allow the Federal correctional facility to offer online educational/vocational training programmes using the tablets in their cells to pave the way for a smoother productive reintegration into the society upon their release from the correctional facility.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110. The regional cloud 105 also includes an SAS instance 115 to allocate frequency bands to operators, e.g., to the private enterprise network 110 for CBRS within the 3550-3700 MHz band. The communication system 100 also includes another regional cloud 106 that includes an SAS instance 116. In the illustrated embodiment, the regional clouds 105, 106 are located at different geographic locations and are therefore used to provide geo-redundancy. For example, the SAS instance 115 can be selected as a primary SAS and the SAS instance 116 can be selected as a secondary, geo-redundant SAS. The SASs 115, 116 communicate with each other over an SAS-SAS interfaces (not shown in FIG. 1 in the interest of clarity). If additional SAS instances are present in the communication system 100, the SAS instances communicate with each other over corresponding SAS-SAS interfaces. The SASs 115, 116 can serve multiple private enterprise networks, although a single private enterprise network 110 is shown in FIG. 1 in the interest of clarity.

The regional clouds 105, 106 are configured via user interface portals to one or more external computers 120, only one of which is shown in FIG. 1 in the interest of clarity. For example, the external computer 120 can provide a customer user interface portal for service management, a digital automation cloud management user interface portal, and an SAS user interface portal that is used to configure the SASs 115, 116.

The private enterprise network 110 includes an edge cloud 125 that communicates with the regional clouds 105, 106 to support a plug-and-play deployment of the private enterprise network 110. Some embodiments of the edge cloud 125 support auto configuration and self-service, industrial protocols, local connectivity with low latency, LTE-based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, or other wireless devices or wireless access devices. As used herein, the term "base station" refers to any device that provides wireless connectivity in the private enterprise network 110. Some embodiments of the base station operate as a CBSD, e.g., as either category A CBSD (Indoor), Category B CBSD (outdoor), or customer premises equipment (CPE). The CBSDs 131, 132, 133 are therefore referred to herein as the base stations 131, 132, 133 and collectively as "the base stations 131-133." Some embodiments of the domain proxy 130 are implemented in one of the regional clouds 105, 106.

The domain proxy 130 mediates between the SASs 115, 116 and the base stations 131-133. In order to utilize the shared spectrum, the base stations 131-133 transmit requests towards one of the SASs 115, 116 to request allocation of a portion of a frequency band. The other one of the SASs 115, 116 is used as a secondary SAS in case of a failure associated with the primary SAS. The requests include information identifying the portion of the frequency band such as one or more channels, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SASs 115, 116 by aggregating requests from multiple base stations 131-133 into a smaller number of messages that are transmitted from the domain proxy 130 to the SASs 115, 116. The base stations 131-133 provide wireless connectivity to corresponding user equipment 135, 136, 137 (collectively referred to herein as "the user equipment 135-137") in response to the SASs 115, 116 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mine or prison and the base stations 131-133 are used to provide wireless connectivity within different locations that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from one of the base stations 131-133. The domain proxy 130 determines whether the requesting base station from which the request is received is permitted to access the SAS instance 115 based on the policy, e.g., by comparing information in the policy to information in one or more mandatory fields of the request. The domain proxy 130 selectively provides the requests to the SASs 115, 116 depending on whether the requesting base station is permitted to access the SASs 115, 116. If so, the request is transmitted to the SASs 115, 116 or aggregated with other requests for transmission to the SASs 115, 116. Otherwise, the request is rejected.

As discussed herein, the FCC requires certified professional installers (CPI) to perform the installation of outdoor (Category B) CBSDs and indoor (Category A) CBSDs that are deployed outside at a height above 6 meters (m). A complete installation includes testing and verification of the newly installed base station (or CBSD) while the base station is authorized to transmit (and receive) signals over one or more channels. For example, the CPI performs testing and verification on the base station 131 in response to installing the base station 131. In the illustrated embodiment, the SAS 115 (or, in other embodiments, the SAS 116) receives a registration request from the base station 131 in response to the base station 131 being installed. The SAS 115 allocates to the base station 131 a channel in the shared spectrum and a transmission power to be used by the base station 131. The SAS 115 transmits a test grant authorizing the base station 131 to transmit on the channel at the transmission power for a predetermined time interval such as 15 minutes or 30 minutes. The SAS 115 converts the test grant to a suspended grant following the predetermined time interval. In some cases, the SAS 115 receives the registration request from the base station 131 in response to the base station 131 being installed in the DPA 110.

Figure 2:
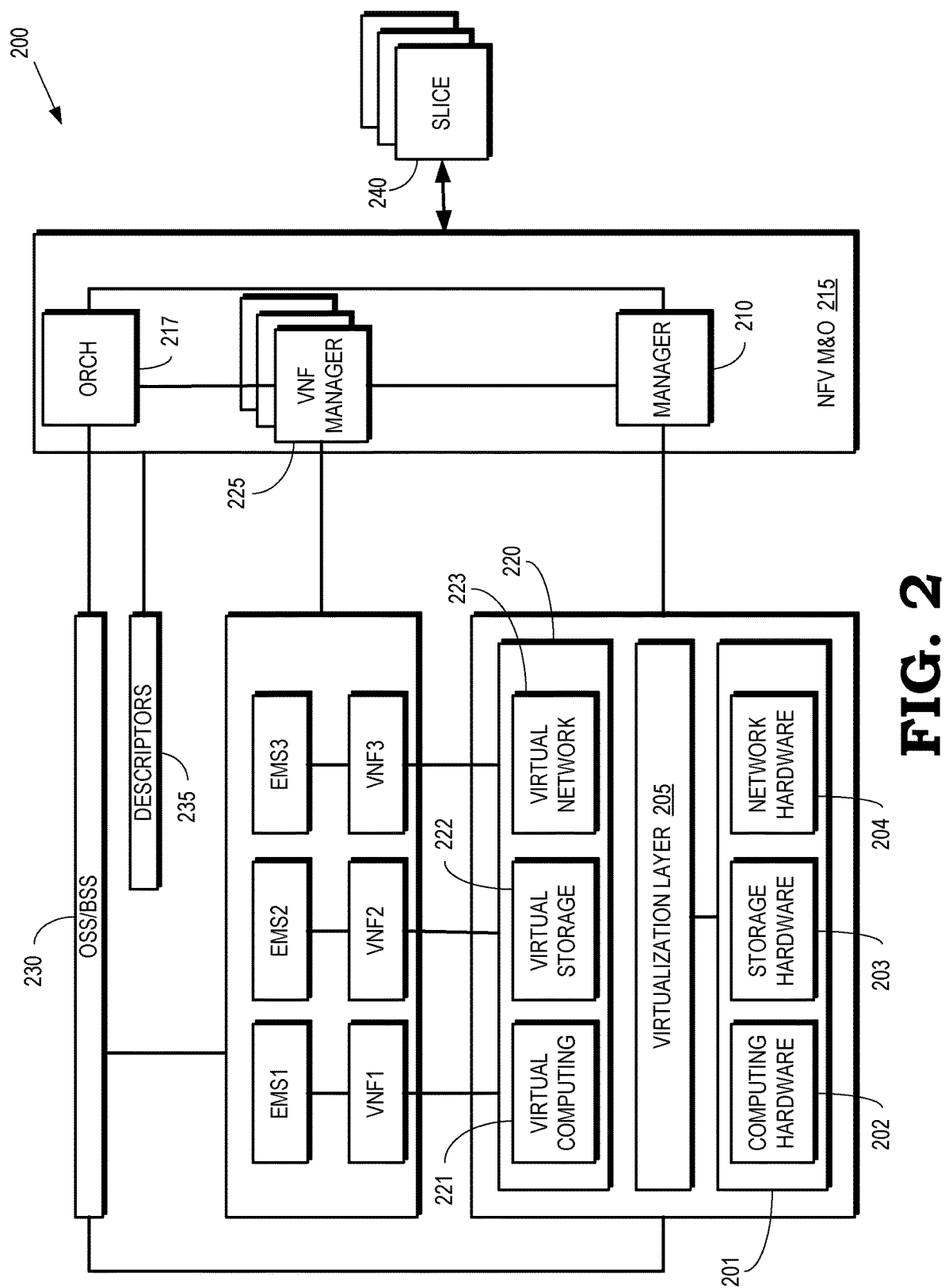
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the virtualized infrastructure manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) are implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the virtualized infrastructure manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. Information in the descriptors 235 may be updated or modified by the NFV M&O 215.

The NFV architecture 200 can be used to implement network slices 240 that provide user plane or control plane functions. A network slice 240 is a complete logical network that provides communication services and network capabilities, which can vary from slice to slice. User equipment can concurrently access multiple network slices 240. Some embodiments of user equipment provide Network Slice Selection Assistance Information (NSSAI) parameters to the network to assist in selection of a slice instance for the user equipment. A single NSSAI may lead to the selection of several network slices 240. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different network slices 240.

Figure 3:
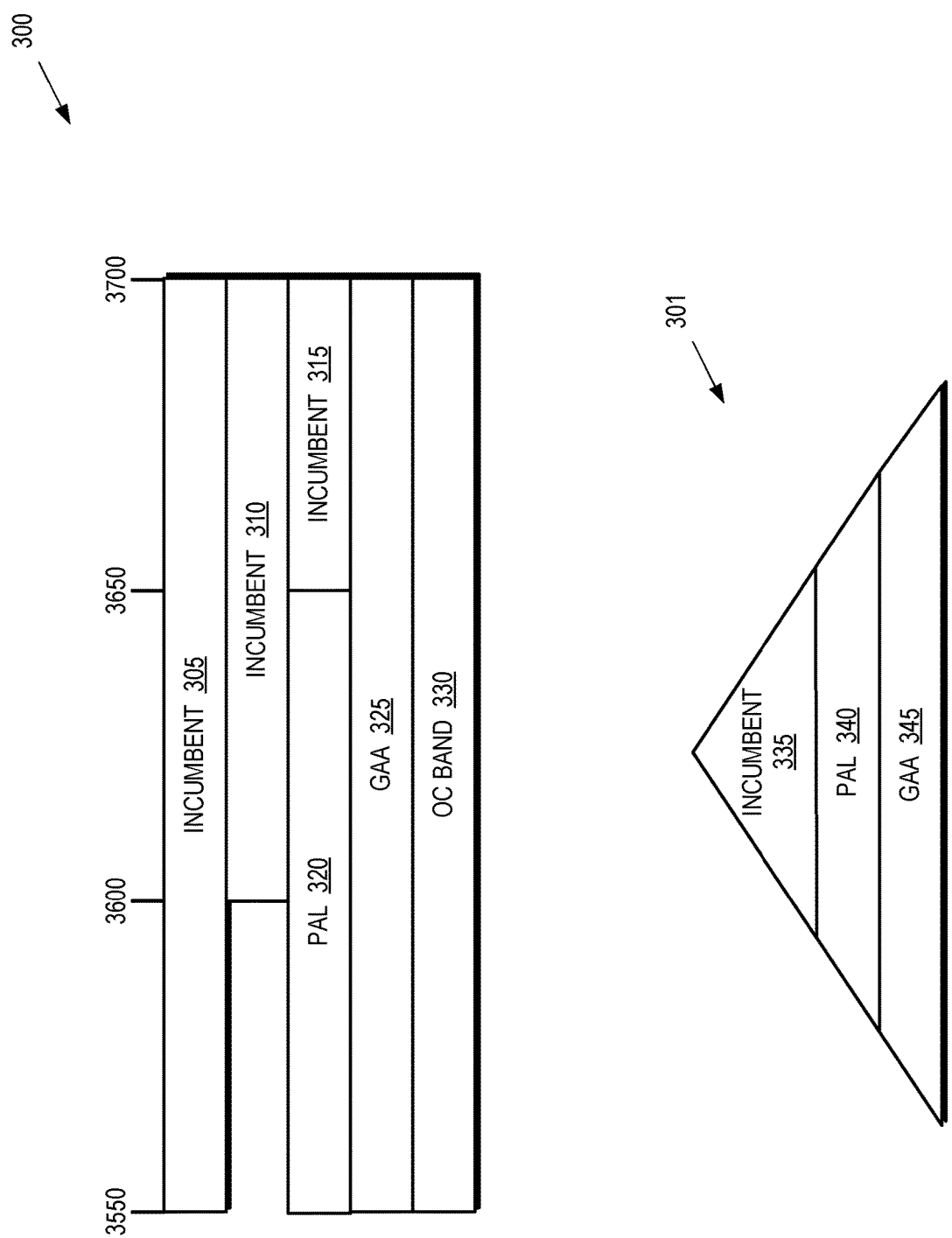
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as one of the SAS instances 115, 116 shown in FIG. 1 allocates portions of the frequency band to devices for providing wireless connectivity within a geographic area. For example, the SAS can allocate 20-40 MHz portions of the frequency band to different devices for use as communication channels.

Portions of the frequency band are allocated to incumbent federal radio location devices, such as Navy ships, from the block 305, which corresponds to all the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the lower 100 MHz of the CBRS band as long as it is not pre-empted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area.

Figure 4:
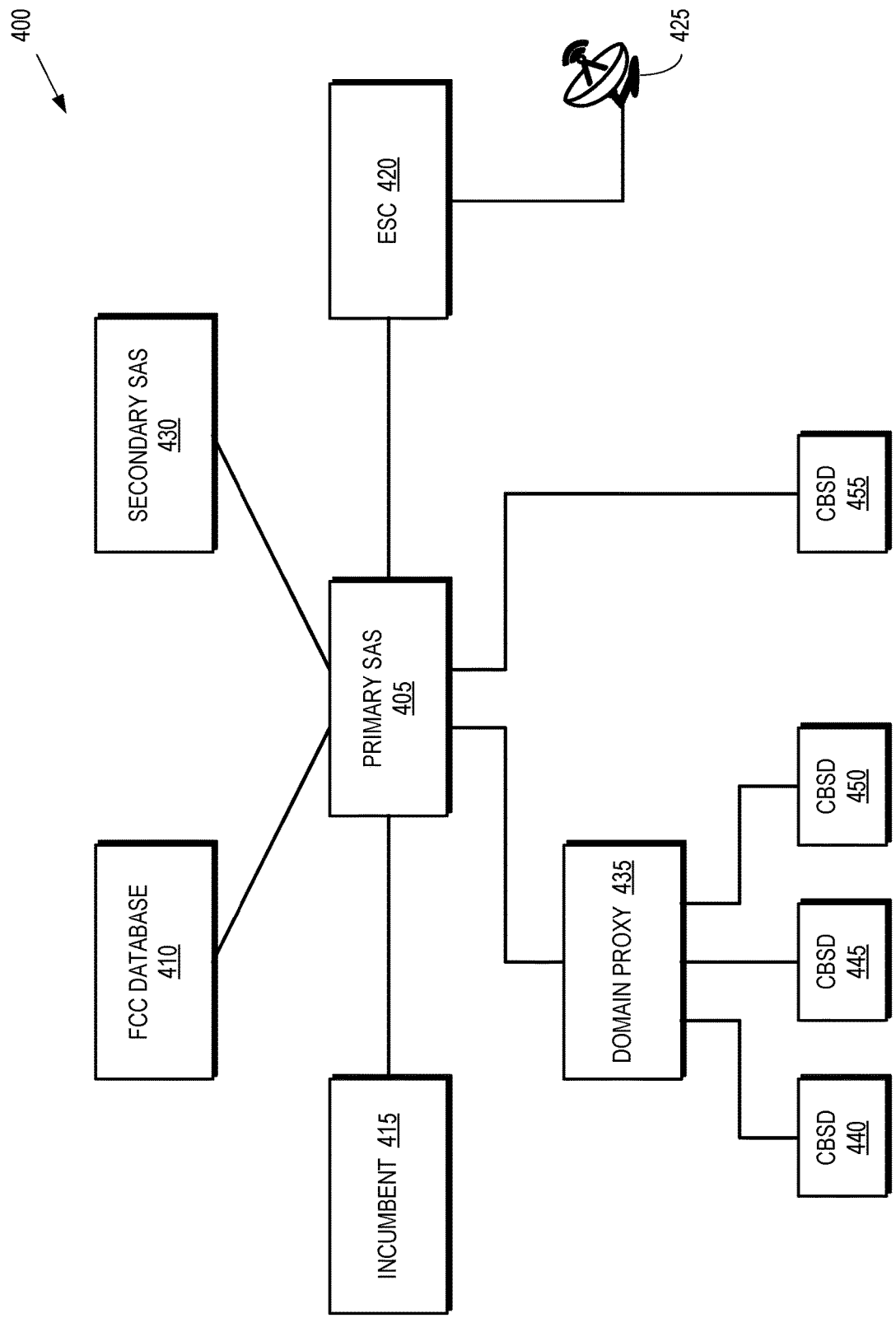
FIG. 4 is a block diagram of a communication system that implements tiered spectrum access according to some embodiments.

FIG. 4 is a block diagram of a communication system 400 that implements tiered spectrum access according to some embodiments. In the illustrated embodiment, the communication system 400 implements tiered spectrum access in the 3550-3700 CBRS band via a WlnnForum architecture. The communication system 400 includes an SAS instance 405 that performs operations including incumbent interference determination and channel assignment, e.g., for CBRS channels shown in FIG. 3. In the illustrated embodiment, the SAS instance 405 is selected as a primary SAS. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS instance 405. The SAS instance 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS instance 405 are connected to other SAS instance 430, e.g., a secondary SAS instance 430. The primary and secondary SAS instance 405, 430 are connected via corresponding interfaces so that the SAS instance 405, 430 coordinate allocation of portions of the frequency range in geographic areas or time intervals.

A domain proxy 435 mediates communication between the SAS instance 405 and one or more CBSDs 440, 445, 450 via corresponding interfaces. The domain proxy 435 receives channel access requests from the CBSDs 440, 445, 450 and verifies that the CBSDs 440, 445, 450 are permitted to request channel allocations from the SAS instance 405. The domain proxy 435 forwards requests from the permitted CBSDs 440, 445, 450 to the SAS instance 405. In some embodiments, the domain proxy 435 aggregates the requests from the permitted CBSDs 440, 445, 450 before providing the aggregated request to the SAS instance 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS instance 405, the domain proxy 435 operates as a single entity that hides or abstracts presence of the multiple CBSDs 440, 445, 450 and conveys communications between the SAS instance 405 and the CBSDs 440, 445, 450. One or more CBSD 455 (only one shown in the interest of clarity) are connected directly to the SAS instance 405 and can therefore transmit channel access requests directly to the SAS instance 405. Additional discussion of this architecture is provided in Appendix B, from the Wireless Innovation Forum, entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
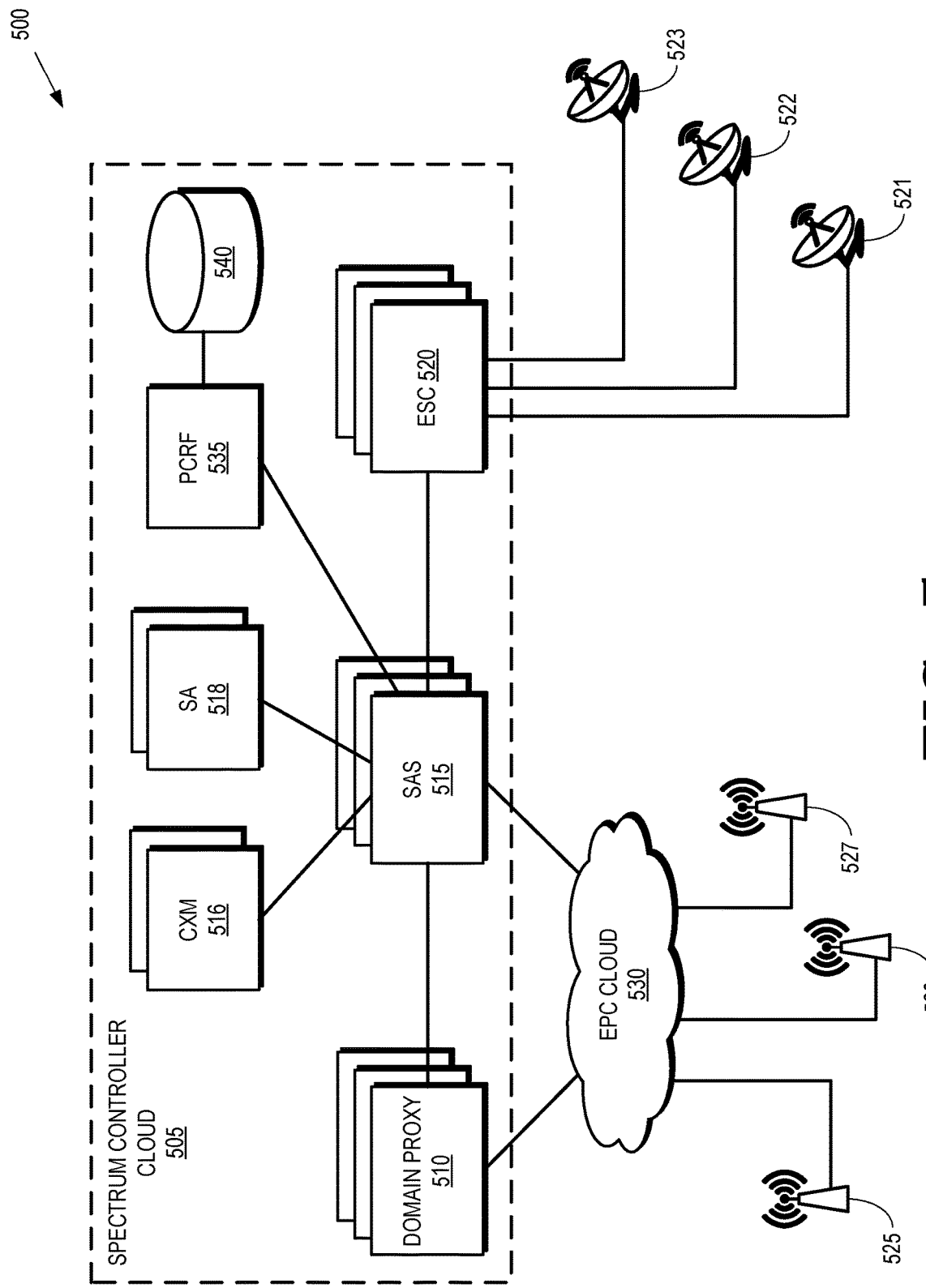
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum controller cloud 505 instantiates multiple instances of domain proxies 510 that support one or more private enterprise networks. The spectrum controller cloud 505 also instantiates multiple SAS instances 515 that support one or more private enterprise networks. Although not shown in FIG. 5, the SAS instances 515 can be connected to other SAS instances, e.g., in other clouds, via corresponding interfaces. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship. The ESC instances 520 notify the corresponding instance of the SAS instance 515 in response to detecting the presence of an incumbent in a corresponding geographic area. The SAS instance 515 is then able to instruct non-incumbent devices that serve the geographic area to vacate portions of the spectrum overlapping with the spectrum allocated to the incumbent, e.g., by defining a DPA. As discussed herein, some embodiments of the SAS instance 515 register with an ESC cloud to provide ESC services for the SAS instance 515 (or an SAS administrator for the SAS instance 515). Thus, although FIG. 5 depicts the SAS instance 515 and the ESC instances 520 as part of the same spectrum controller cloud 505, the ESC instances 520 are not necessarily deployed in the same location or controlled by the same vendor or provider as the SAS instances 515.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 525 operates according to a PAL and GAA in the 3.5 GHz frequency band. The base stations 525-527 are configured as Category A (indoor operation with a maximum power of 30 dBm), Category B (outdoor operation with a maximum power of 47 dBm), or CPE. However, in other embodiments, one or more of the base stations 525-527 are configured as either Category A, Category B, or CPE. The EPC cloud 530 provides functionality including LTE EPC operation support system (OSS) functionality, analytics such as traffic analytics used to determine latencies, and the like.

The spectrum controller cloud 505 also includes a policy control and rules function (PCRF) 535 that creates policy rules and makes policy decisions for network subscribers in real-time. The PCRF 535 supports service data flow detection, policy enforcement, and flow-based charging. Some embodiments of the PCRF 535 determine the policy and charging records for SAS service to the CBRS RAN providers who sign up to receive the SAS service. Policies created or accessed by the PCRF 535 for network subscribers are stored in a corresponding database 540 in records associated with the different subscribers.

Figure 6:
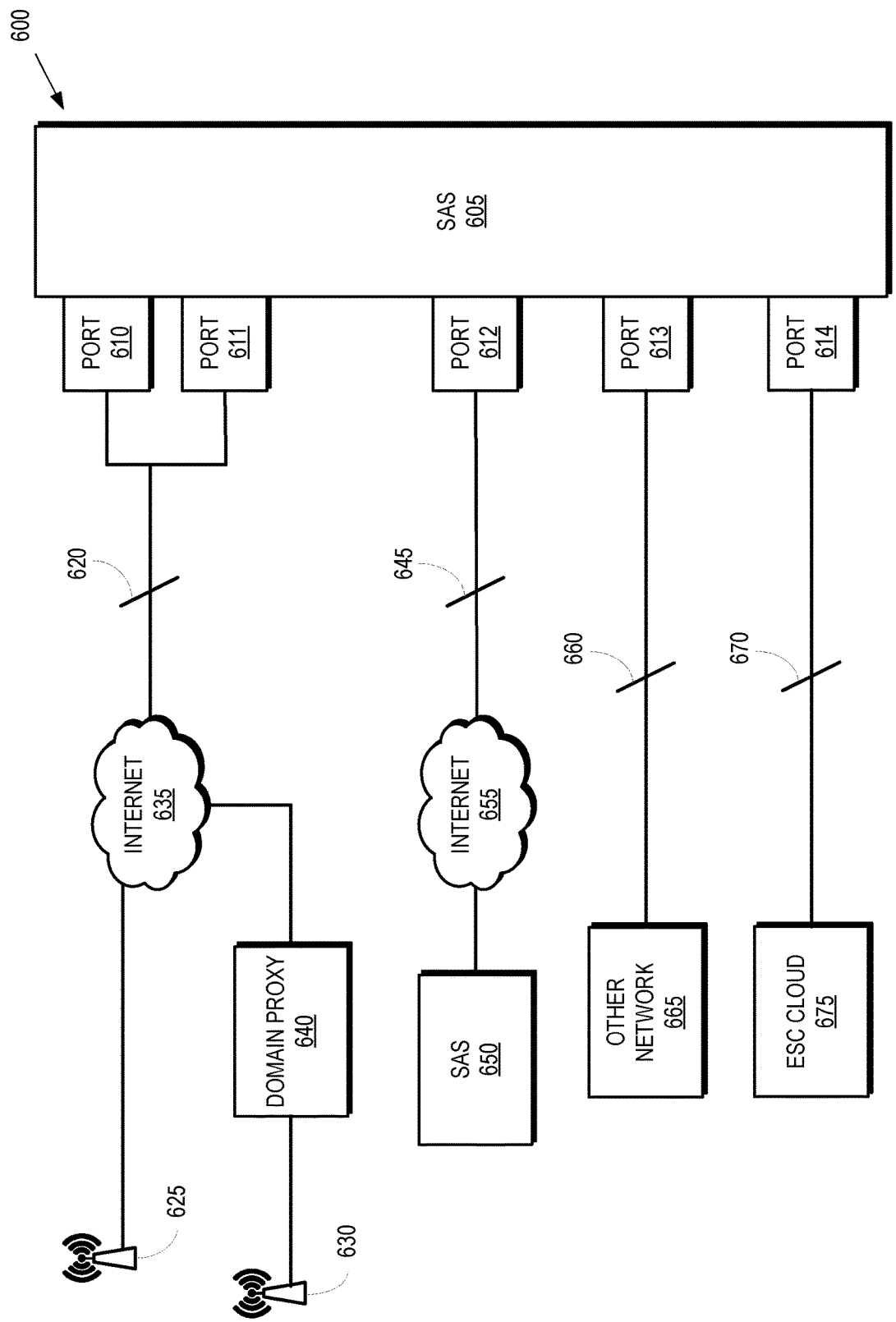
FIG. 6 is a block diagram of communication system including interfaces between Citizens Broadband radio Service Devices (CBSDs) and a spectrum access system (SAS) instance according to some embodiments.

FIG. 6 is a block diagram of communication system 600 including interfaces between CBSDs and an SAS instance 605 according to some embodiments. The SAS instance 605 is used to implement some embodiments of the SAS instance 115 shown in FIG. 1, the SAS instance 405, 430 shown in FIG. 4, and the instances of the SAS instance 515 shown in FIG. 5. The SAS instance 605 includes ports 610, 611, 612, 613, 614 (collectively referred to herein as "the ports 610-614") that provide access to the SAS instance 605.

An interface 620 supports communication between the SAS instance 605 and CBSDs 625, 630 via a network such as the Internet 635 and the ports 610, 611. The CBSD 625 is connected directly to the SAS instance 605 via the interface 620. The CBSD 630 is connected to the SAS instance 605 via a domain proxy 640 that is connected to the SAS instance 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS instance 605 and one or more other SAS instances 650 (only one shown in FIG. 6 in the interest of clarity) via a network such as the Internet 655 and the port 612. The SAS instance 650 can be owned and operated by other providers. An interface 660 supports communication between the SAS instance 605 and one or more other networks 665 (only one shown in FIG. 6 in the interest of clarity) via the port 613. An interface 670 supports communication between the SAS instance 605 and an ESC cloud 675 that provides ESC services to the SAS instance 605, e.g., within a DPA associated with the SAS instance 605.

Figure 7:
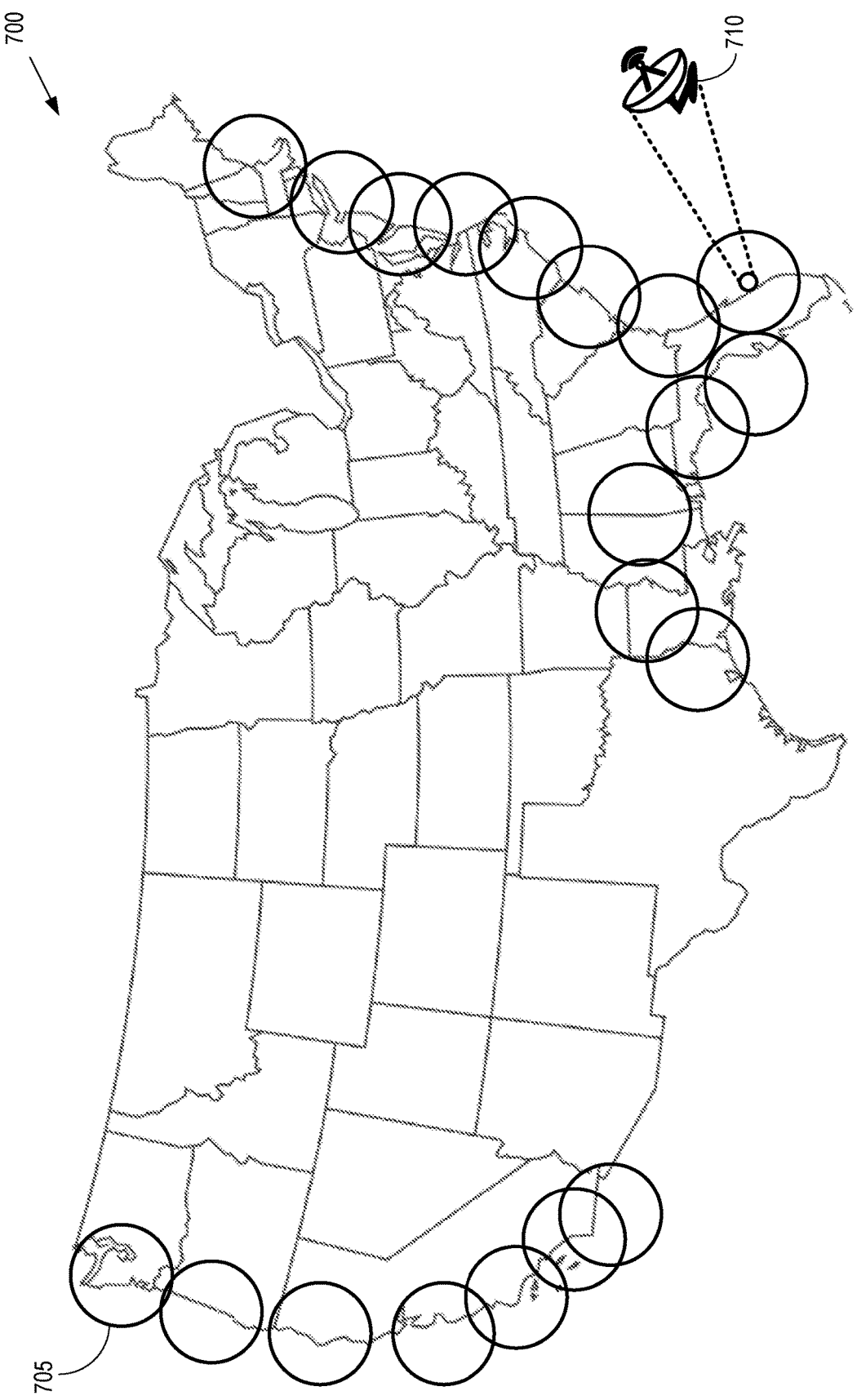
FIG. 7 is a map of the borders of the United States that illustrates a set of dynamic protection areas (DPAs) defined at different geographic locations within the United States according to some embodiments.

FIG. 7 is a map 700 of the borders of the United States that illustrates a set of DPAs defined at different geographic locations within the United States according to some embodiments. The DPAs 705 (only one indicated by a reference numeral in the interest of clarity) are typically, but not necessarily, defined near coastal regions to protect incumbents such as Navy ships. A DPA 705 can only be deactivated by an operational ESC sensor and consequently any communication system that uses the CBRS spectrum must include an ESC sensor, such as the ESC sensor 710, to have full access to the CBRS spectrum. Each ESC sensor 710 is also required to maintain an exchange of heartbeat messages with the ESC cloud that in turn connects with one or more SAS instances to verify that the ESC sensors 710 within the DPA 705 are operational. If there are no operational ESC sensors deployed within a DPA, FCC rules require that the DPA must be activated throughout the entire 150 MHz CBRS spectrum. Moreover, no outdoor CBSDs (Category B) can be deployed in a DPA 705 without an ESC sensor 710 in the DPA 705.

Figure 8:
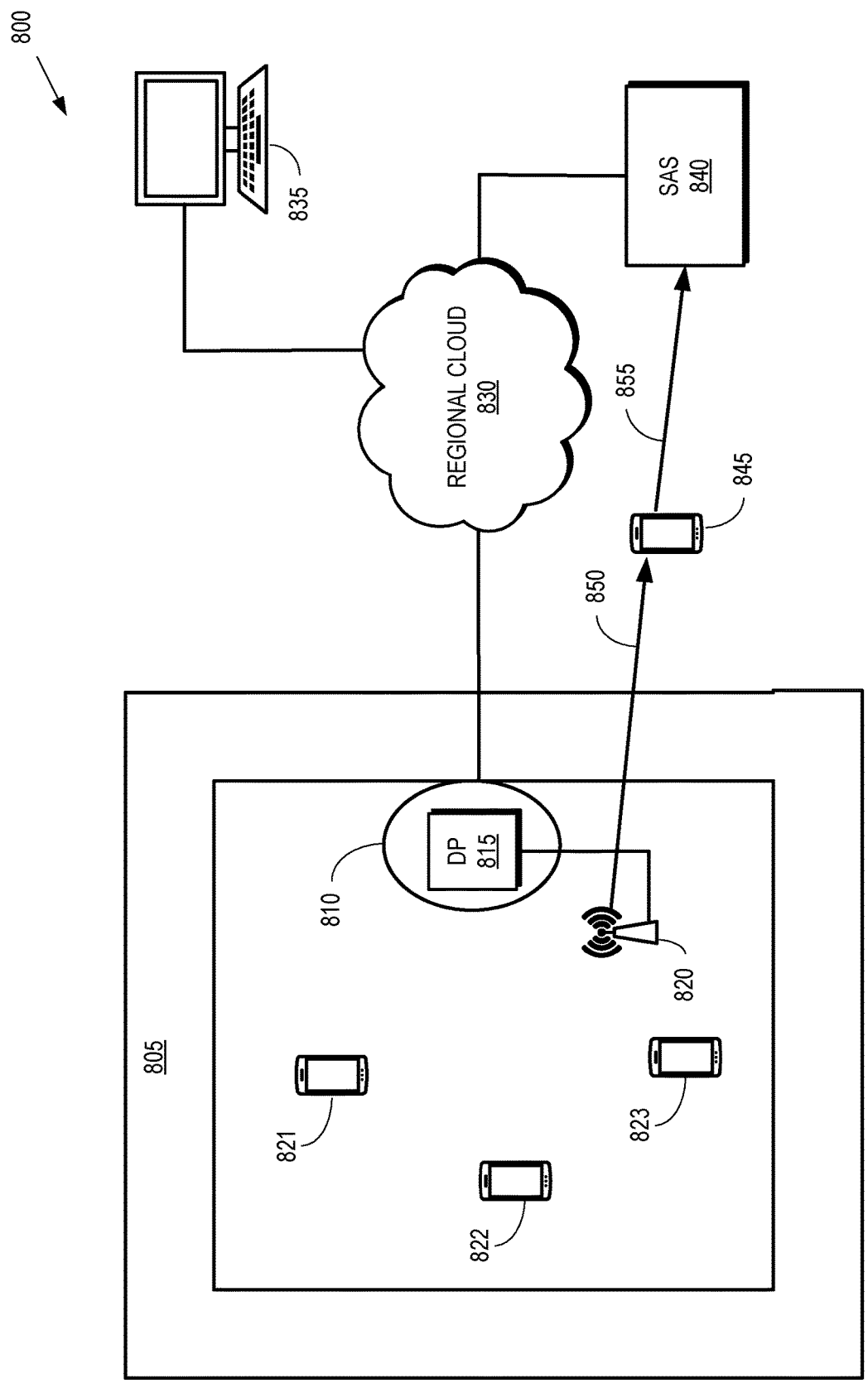
FIG. 8 is a block diagram of a communication system that provides wireless connectivity within a structure or location that has a large propagation loss from interior to exterior according to some embodiments.

FIG. 8 is a block diagram of a communication system 800 that provides wireless connectivity within a structure or location that has a large propagation loss from interior to exterior according to some embodiments. In the illustrated embodiment, the communication system 800 provides wireless connectivity to the interior of a structure 805 that is separated from an exterior environment by walls, rock, earth, or other materials that engender a significant propagation loss for signals that are transmitted within a predetermined frequency range such as radiofrequency signals or millimeter wave signals. Examples of structures 805 include, but are not limited to, prisons, fortresses, bunkers, minds, or other subterranean structures.

An edge cloud network 810 is implemented within or proximate to the structure 805, e.g., using one or more processors, memories, or transceivers. In the illustrated embodiment, the edge cloud network 810 supports services including auto configuration, self-service, industrial protocols, local connectivity and low latency, LTE, local security, and high availability, as well as other applications. The edge cloud network 810 implements a domain proxy (DP) 815 that provides managed access and policy control to one or more CBSDs 820 (only one shown in FIG. 8 in the interest of clarity) that are implemented using base stations, base station routers, mini-macrocells, microcells, indoor/outdoor picocells, femtocells, or other wireless devices or wireless access devices. The CBSD 820 provides wireless connectivity to user equipment 821, 822, 823, 824 (collectively referred to herein as "the user equipment 821-824") within the structure 805. The domain proxy 815 residing on the edge cloud network 810 may support CBSDs of both category A (indoor), and category B (outdoor) that directly support the SAS-CBSD WINNFORUM protocol stack to be controlled by the SAS 840 for operation in the CBRS band. In the illustrated embodiment, the edge cloud network 810 is localized to the premises of the structure 805.

The edge cloud network 810 is connected to a regional cloud network 830 that that supports functionality including O&M management, a customer portal, data analytics, software management, central security, as well as spectrum access systems (SAS) in some cases. In the illustrated embodiment, the edge cloud network 810 connects with the NDAC regional cloud network 830 to download the generic software including the core network and configuration information. Once operational, the edge cloud network 810 operates as a fully functional cellular enterprise network. For improved performance and high network availability/reliability use case scenarios, the domain proxy 815 can be implemented as an integral part of the edge cloud infrastructure in the overall NDAC architecture to unlock the use of the shared spectrum. The Regional SAS communicates with an ESC cloud service to enable the use of the lower 100 MHz of the CBRS shared spectrum along the U.S coastline in areas that are designated as Dynamic Protection Area (DPA). The regional cloud network 830 is accessed via portals implemented on one or more access devices 835. Examples of the portals include, but are not limited to, a customer portal for service management, an NDAC management portal, and an NSC SAS portal. In the illustrated embodiment, the regional cloud network 830 is connected to an SAS 840.

Instead of assuming a conventional path loss through the structure 805, such as a 15 dBm path loss, the edge cloud network 810 and the CBSD 815 are configured to provide wireless connectivity based on a measured path loss due to propagation of signals from the interior of the structure 805 to the exterior of the structure 805. In the illustrated embodiment, a measurement device 845 measures a signal strength of a signal 850 that is generated by the CBSD 820 and transmitted from the interior of the structure 805 to the measurement device 845. The measurement device 845 determines a path loss for the signal 850, e.g., based on a known or predetermined transmission power of the CBSD 820 and a received signal strength indicator that is measured at the measurement device 845. Information 855 indicating the path loss or propagation loss of the signal 850 is provided to the SAS 840.

The SAS 840 includes a transceiver that receives the information 855 indicating a path loss from an interior location of the structure 805 to an exterior location in response to the CBSD 820 being installed at the interior location of the structure 805. The SAS 840 also includes a processor to determine an aggregate interference level for an incumbent proximate the exterior location based on the path loss. The SAS 840 then allocates one or more channels to the CBSD 820 based on the aggregate interference level. Due to the relatively high path loss from the interior to the exterior of the structure 805, the SAS 840 can allocate or permit the CBSD 820 to transmit at a higher power level than would be permitted based on the conventional assumption of a 15 dBm path loss, e.g., the CBSD 820 can be permitted to transmit at the maximum power level of 30 dBm.

Figure 9:
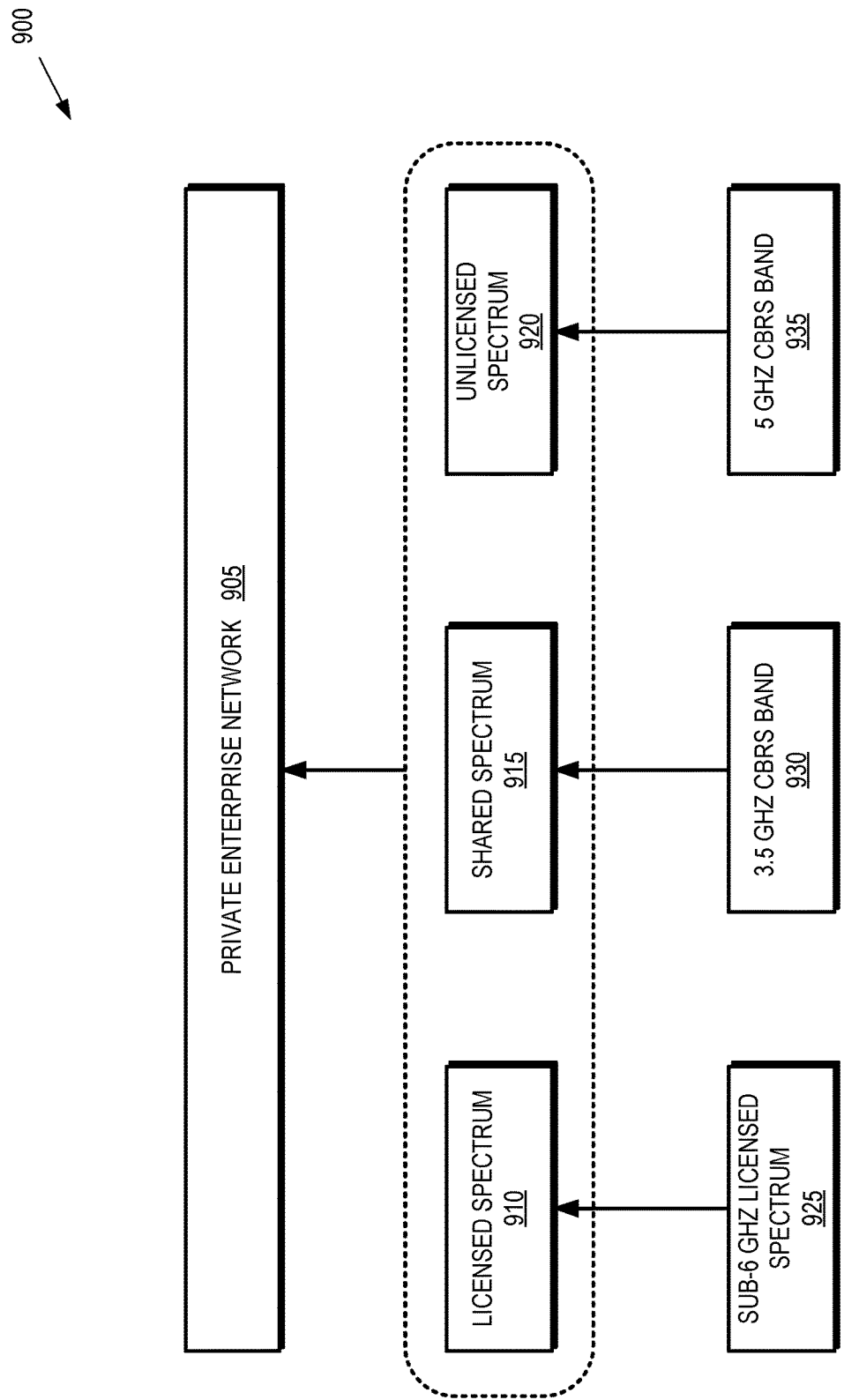
FIG. 9 is a block diagram illustrating a spectrum allocation according to some embodiments.

FIG. 9 is a block diagram illustrating a spectrum allocation 900 according to some embodiments. A private enterprise network 905 aggregates different portions of spectrum including a licensed spectrum 910, a shared spectrum 915, and an unlicensed spectrum 920. In the illustrated embodiment, the licensed spectrum 910 includes a sub-6 GHz licensed spectrum 925, the shared spectrum 915 includes the 3.5 GHz CBRS band 930, and the unlicensed spectrum 920 includes the 5 GHz CBRS band 935.

Figure 10:
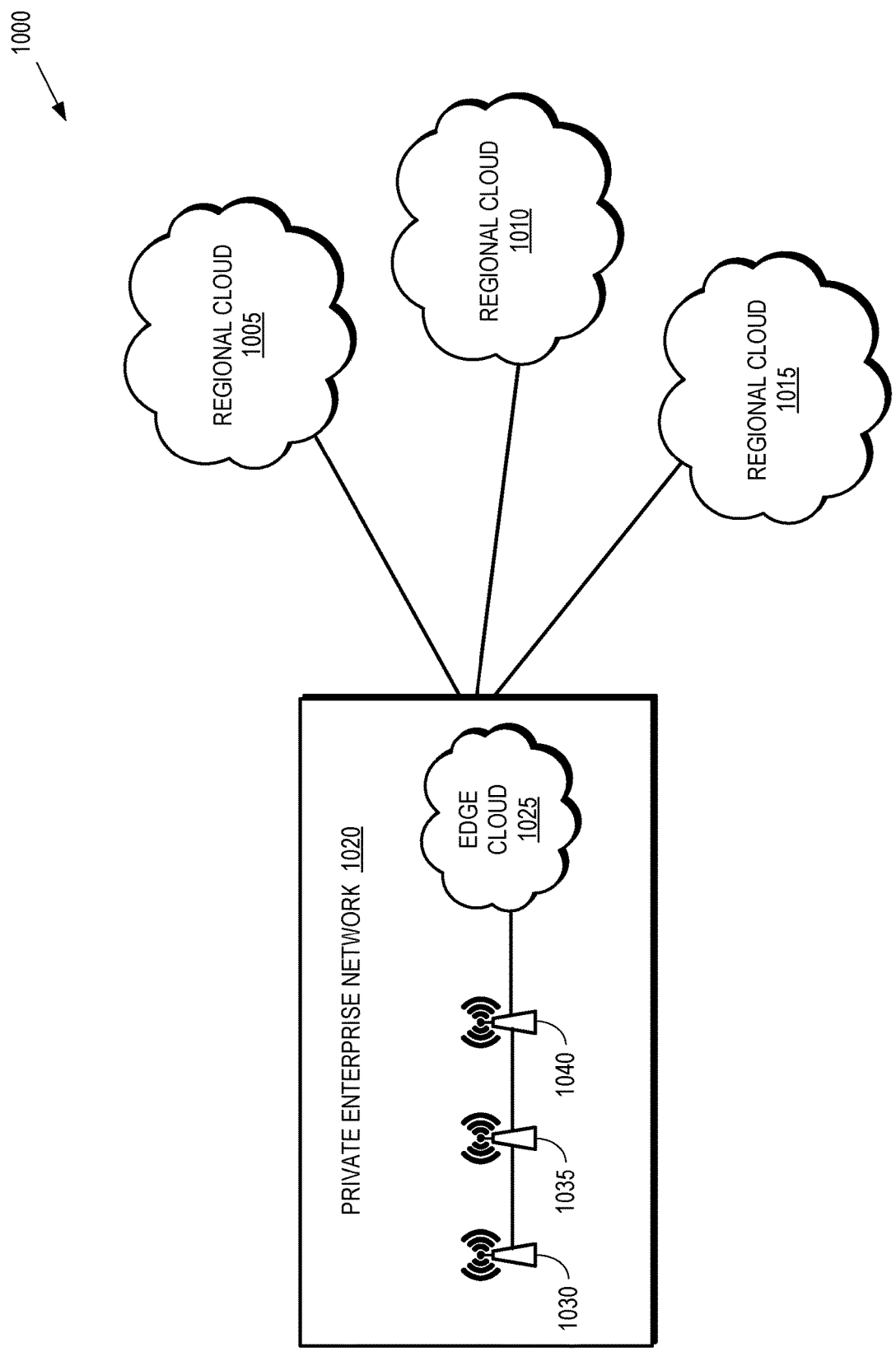
FIG. 10 is a block diagram of a communication system to reduce or eliminate radio access network service downtime according to some embodiments.

FIG. 10 is a block diagram of a communication system 1000 to reduce or eliminate radio access network service downtime according to some embodiments. The communication system 1000 includes the regional cloud networks 1005, 1010, 1015, which are connected to a private enterprise network 1020. In the illustrated embodiment, the private enterprise network 1020 includes an edge cloud network 1025 (which implements a domain proxy, as discussed herein) and one or more CBSD including a picocell 1030, a microcell 1035, and a macrocell 1040.

The CBSDs 1030, 1035, 1040 in indoor environments that are shielded from the external world by high path loss interfering objects, such as thick concrete walls, are nevertheless subject to the same usage constraints in DPA as CBSDs that create more interference over a wider area. The thick concrete walls such as used in underground subterranean structures and fortresses (such as the Federal prison system) pose serious performance and coverage challenges for a Wi-Fi based enterprise network deployment solution. Thick prison walls not only impede Wi-Fi signals that has contention based MAC layer and a much lower UL transmit power allowance on the UE side compared to the cellular (LTE/5G) technologies, but the need to install ruggedized/robust radio units on prison walls due to prisoners' tendency to damage/scavenge components from indoor units makes deployment even more challenging using Wi-Fi with coverage holes and inferior QOS compared to cellular (4G/5G) private enterprise networks.

The CBSDs 1030, 1035, 1040 can therefore be implemented as ruggedized/robust radio units. By mounting the ruggedized/robust LTE/5G radio units 1030, 1035, 1040 on prison walls, the communication system 1000 can provide superior QOS and coverage solution compared to a conventional Wi-Fi system. In a prison setting, this allows the inmates to use a ruggedized tablet in their cell for video calling their loved ones more often daily saving them the family members the ignominy of travelling to the correctional/prison facility for a visit. The ruggedized/robust LTE/5G radio units 1030, 1035, 1040 also provide the Federal correctional facility with the ability to offer online educational/vocational training programs to the inmates using the tablets in their cells to pave the way for a smoother productive reintegration into the society upon their release from the correctional facility.

The domain proxy on the edge cloud network 1025 of the private cellular enterprise network 1020 contains policy control features that enable the facility owners to define a policy per CBSD basis that determines the hours of operations of the CBSDs within a facility.

As discussed herein, the current CBRS standards as defined by the WINNF specification force the SAS to add 15 dB to the computed loss irrespective of the building structure (class vs thick concrete walls, or subterranean etc) to account for attenuation due to building (penetration) loss for all CBSDS that are deployed indoors. The implication is that if the deployment facility falls in proximity to any type of incumbent, the SAS may perform incumbent protection and not grant the full 30 dBm Tx power to the indoor CBSDs 1030, 1035, 1040 even though the building structure may be of thick concrete that will prevent any signals from the indoor CBSD 1030, 1035, 1040 to be completely localized within the facility (such as subterranean structures, mines, fortresses including prison system, nuclear power plant etc).

The lowered Tx power to the indoor CBSD would result in coverage loss that may result in coverage holes, and below par QOS compared to the deployment plans.

At least in part to address these drawbacks in the conventional practice, the penetration loss is measured and provided to the corresponding SAS, which uses the information for allocation, incumbent detection, and selectively disabling CBSDs 1030, 1035, 1040 in the presence of an incumbent, as discussed herein. In some embodiments, a Certified Professional Installer (CPI) determines the actual observed signal strength outside the facility from the deployed indoor CBSDs 1030, 1035, 1040 while transmitting at max allowed indoor Tx power level of 30 dBm. This information is then fed to the SAS that will use the accurate calculated value of path loss for the indoor CBSDs 1030, 1035, 1040 in terms of computing the overall aggregate interference level to the nearby incumbent. This would result in the SAS allocating a channel for indoor CBSDs 1030, 1035, 1040 in these facilities where the CBSD signal never reaches outside the facility, with full allowed Tx power limit of 30 dBm as opposed to some lower Tx power level it would have allowed if it had taken the standards defined universal 15 dB penetration loss for indoor CBSDs 1030, 1035, 1040 irrespective of the facility structure type.

Figure 11:
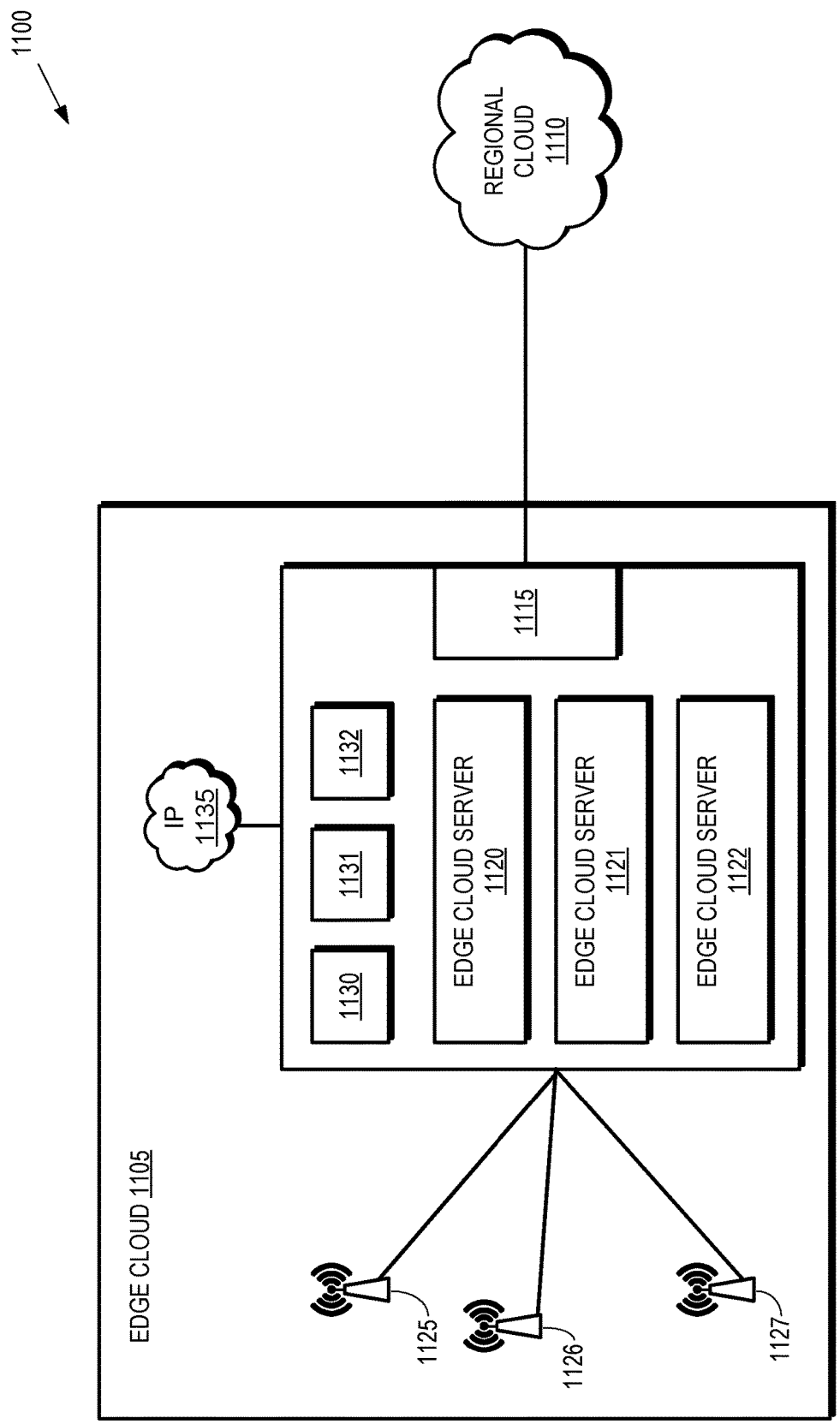
FIG. 11 is a block diagram of a communication system including an edge cloud according to some embodiments.

FIG. 11 is a block diagram of a communication system 1100 including an edge cloud 1105 according to some embodiments. The edge cloud 1105 is used to provide data security and isolation. The edge cloud 1105 is therefore connected to a regional cloud network 1110 via a firewall 1115 or other secure access pathway. The edge cloud 1105 also includes edge servers 1120, 1121, 1122 that are connected to CBSD 1125, 1126, 1127 that provide wireless connectivity. The edge cloud 1105 also supports containers 1130, 1131, 1132 for connectivity and selected digital automation enabler such as positioning, drones, push-to-talk, domain proxy, and third-party applications that are running locally on the edge cloud 1105. The edge cloud further supports a customer IP network 1135.

Customer network traffic is routed inside the customer network according to their IT security requirements, e.g., via the customer IP network 1135, which differentiates the communication system 1100 from conventional NDAC solutions and the functionality provided by other MNO/MSOs to vertical market segment in terms of data protection and isolation. In the conventional case, data from all customer deployments traverses a core network, thereby leaving the customer premises. In contrast, in the illustrated embodiment, data remain localized to the customer edge network/premises that has a local EPC core running on the edge cloud network 1105. The NDAC is used to configure the edge cloud network 1105 for providing the data security and isolation.

In some embodiments, calls such as 911 emergency voice over Internet protocol (VoIP) calls are provided in a manner that prevents interruption in the service provided by CBSDs deployed in DBAs. Anytime the private cellular enterprise network employs VoIP features (e.g. in a mine etc) preventing interruption of emergency calls becomes critical as unlike the MNO cellular network the private cellular enterpriser network has no access to licensed spectrum and therefore cannot use carrier aggregation features to continue the VoIP session active if the shared spectrum channel is suddenly taken away by the SAS to protect the incumbent.

The channels allocated to a CBSD that is deployed in a facility in a DPA along the U.S. coastline may be dynamically affected and taken away by the sudden appearance of the Federal incumbent (e.g., a naval cruiser). The ESC sensors that are deployed in the DPA notify the SAS of the incumbent presence and the amount of channel frequency in the lower 100 MHz of the CBRS band that is impacted by it. As per the CBRS rules, the SAS must first and foremost protect the federal incumbent and vacate within 60 seconds of detecting the incumbent presence, all other users (CBSDs) if they happen to be operating within the impacted frequency band. The SAS first deauthorizes the current channel grant to the CBSD in the periodic heartbeat message that forces the CBSD to shut down its operation on its previously granted channel impacting all active call sessions that may be on-going including 911 emergency calls. The SAS then attempts to compute a backup operating channel for the CBSDs to operate and provide that information to the CBSDs in response to subsequent Spectrum Inquiry messages sent by the CBSD. If another valid channel is found and reported back to the CBSD for operation, the cellular service in the impacted geographic area may then resume. This entire channel switching operation may take several minutes and will have serious consequence for an on-going emergency call that will get dropped during this channel switching operation as the enterprise network may not have another carrier to handover the emergency call during this channel switching process.

In some embodiments, emergency call continuation is ensured in a geographic enterprise cellular coverage area that falls within the DPA along the U.S coastline (east, west, and gulf coast). Upon the sudden appearance/detection of an incumbent (naval radar) in a DPA on the channels that were previously allocated by the SAS to a CBSD that is anchoring the 911 emergency call, the 911 emergency call will not get dropped while the SAS, in an attempt to protect the tier-1 naval incumbent, revokes the current channel grant to the CBSD and forces the CBSD to switch to an alternate channel, a process that requires shutting down the current cellular carrier on the first channel frequency, and then bringing it up on the alternate second channel frequency. Dropping the 911 emergency call in the above-mentioned scenario, potentially leads to not only a bad outcome but could also result in liabilities for the CBRS network operator that deploys VoLTE service using the shared spectrum.

To address this problem and ensure emergency call continuation, dual (or multiple) carrier CBSDs are allocated two or more channels (acting as two logical CBSDs) to support the emergency call. The amount of spectrum that is typically impacted by the sudden appearance of the naval cruiser along the coastline is around 20 MHz. The Domain Proxy on the Enterprise edge cloud will have policy control and management capabilities (an add-on feature of NDAC-NSC CBRS architecture solution). The DP will have a policy for emergency call continuation support that will ensure that the two carriers (e.g., the two logical CBSDs) on each physical deployed dual carrier eNB in the enterprise cellular network are spatially separated so that a single incumbent does not result in disabling both channels. For example, the channels allocated to the CBSD for the emergency call can be spatially separated by at least 20 MHz. Thus, the CBSD1 operates using CBRS channel f1, and CBSD2 operates with a different CBRS channel f2, which ensures that both the carriers are not simultaneously (or concurrently) impacted by the sudden appearance of the incumbent. Since the Tx power, and antenna characteristic will be same for both the carriers on the same physical eNB, the cellular coverage area for the two carriers f1, and f2 will most likely be identical.

Since the Domain proxy receives all traffic to/from the CBSDs to the SAS, it will intercept the Spectrum grant request from the CBSDs and evaluate to see that the grant request for the two carriers of each physical eNB (two logical CBSDs, one for each carrier) are as spatially apart as possible. If DP determines that not enough frequency separation is requested by the two logical CBSDs on the same physical eNB, the DP rejects the grant request without forwarding it to the SAS for one of them, forcing the impacted CBSD to choose a different channel f. The logical CBSD whose previous channel grant was rejected may then choose another channel from the Spectrum Inquiry response, and DP using its intelligence will ensure that it will only let the grant request pass through to the SAS if it meets the emergency call continuation policy criteria.

Assuming the emergency call happens to be on a carrier f1 in the above example, and if the incumbent suddenly appears in the DPA, and channel f1 is taken away to protect the incumbent, the SAS forces the CBSD to shut down its operation on channel f1. Due to the overlapping cell coverage area between f1, and f2, when carrier f1 is powered down to protect the incumbent, all call sessions including the emergency call session on f1 will then automatically get handed off to carrier f2 using a standard LTE/5G call/session handover process. This will thus ensure that while protecting the incumbent within the DPA there is no outage in continuing to support the 911 emergency call that may be dealing with some life-threatening situation.

In some embodiments, the architecture disclosed herein supports mission control for Internet-of-things (IoT) devices. Several wireless IoT devices and sensors (such as smoke and radiation detectors, wireless camera) are connected to a private cellular enterprise network using LTE eNBs or 5G gNb. The 5G system provides the low latency air interface for controlling mission control IoT devices and sensors such as deployed in Nuclear power plants etc while the large bandwidth makes supporting the wireless video surveillance camera with AI machine learning based feature detection capability, a reality.

Figure 12:
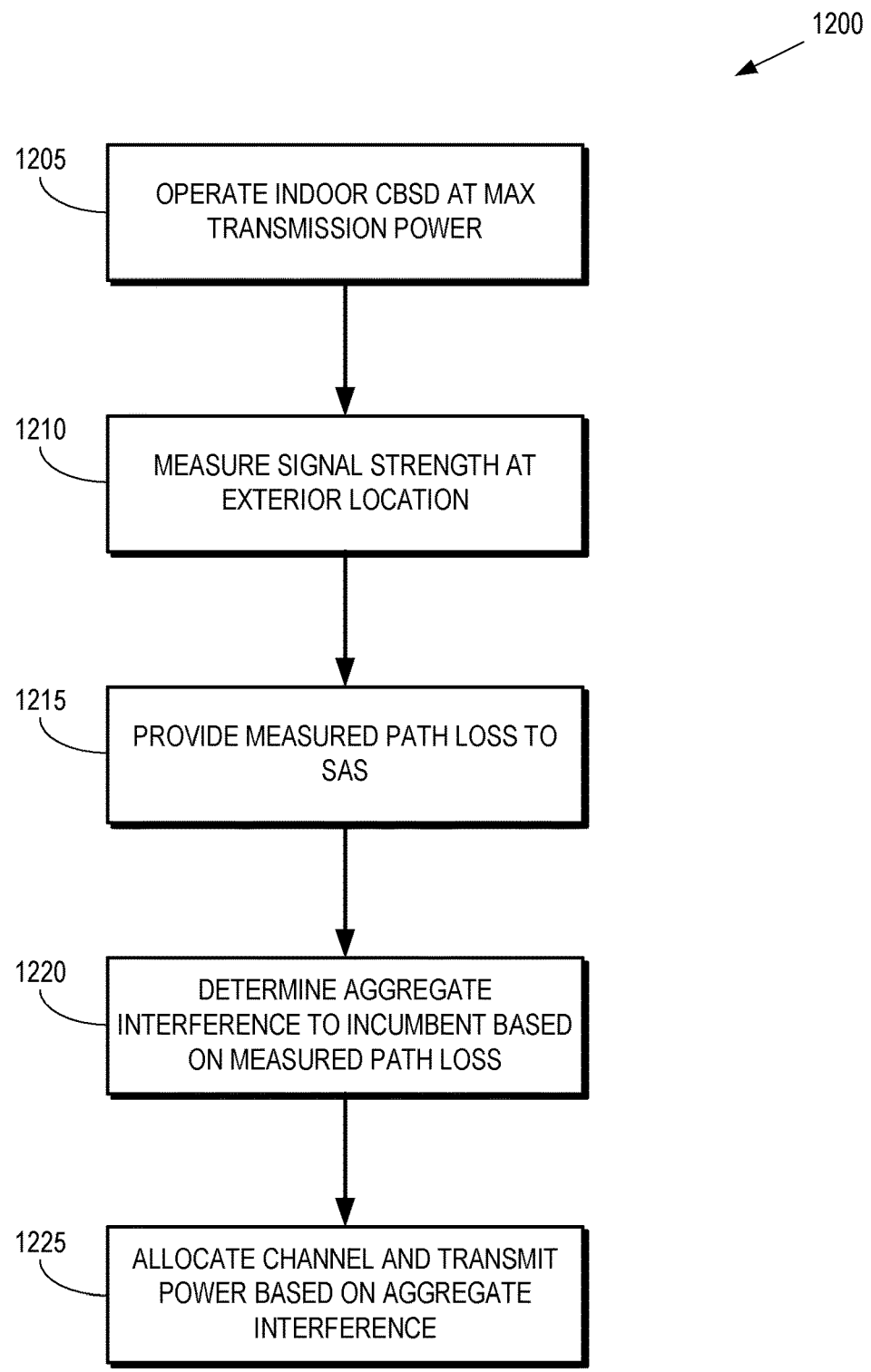
FIG. 12 is a flow diagram of a method of configuring a CBSD based on a measured path loss according to some embodiments.

FIG. 12 is a flow diagram of a method 1200 of configuring a CBSD based on a measured path loss according to some embodiments. At block 1205, an indoor CBSD is operated at a predetermined transmission power level such as a maximum transmission power for the CBSD. At block 1210, a signal received from the indoor CBSD is measured at a location external to a structure that includes the indoor CBSD. A signal strength of the received signal is measured at the external location. A measured path loss is determined by comparing the received signal strength to the known/predetermined transmission power. At block 1215, an indication of the measured path loss from the internal to the external location is provided to the SAS. At block 1220, the SAS determines an aggregate interference level to an incumbent based on the measured path loss or other indication of the received signal strength. At block 1225, the SAS allocates one or more channels and corresponding power levels to the CBSD based on the aggregate interference level.

As discussed herein, the current CBRS standards as defined by the WINNF specification forces the SAS to add 15 dB to the computed loss irrespective of the building structure (class vs thick concrete walls, sub terranean structures or enclosures, and the like) to account for attenuation due to penetration loss for all CBSDs that are deployed within the structure. Consequently, if the deployment facility falls in proximity to any type of incumbent, the SAS may perform incumbent protection and not grant the full 30 dBm Tx power to the indoor CBSDs even though the building structure may be thick enough to prevent any signals from the indoor CBSD from leaking out of the structure. The CBSD signals would therefore be substantially localized within the facility (such as sub terranean structures, mines, fortresses including prison system, nuclear power plant, and the like). The reduction in the Tx power allocated to the indoor CBSD would cause coverage loss that may result in coverage holes and below par QOS compared to the deployment plans.

To address this drawback in the conventional practice, a Certified Professional Installer (CPI) determines the actual observed signal strength outside the facility from the deployed indoor CBSDs while transmitting at max allowed indoor Tx power level of 30 dBm. This information is then fed to the SAS, which uses the accurate calculated value of path loss for the indoor CBSDs to compute the overall aggregate interference level to the nearby incumbent. The SAS allocates the full allowed Tx power limit of 30 dBm to one or more channels for indoor CBSDs operating in these facilities if the penetration loss limits the signal strength of the CBSD signal outside the facility to a value below a threshold. This power allocation can be significantly higher than the Tx power level that the SAS would have allocated if it had used the standards-defined universal 15 dB penetration loss for indoor CBSDs irrespective of the facility structure type.

Figure 13:
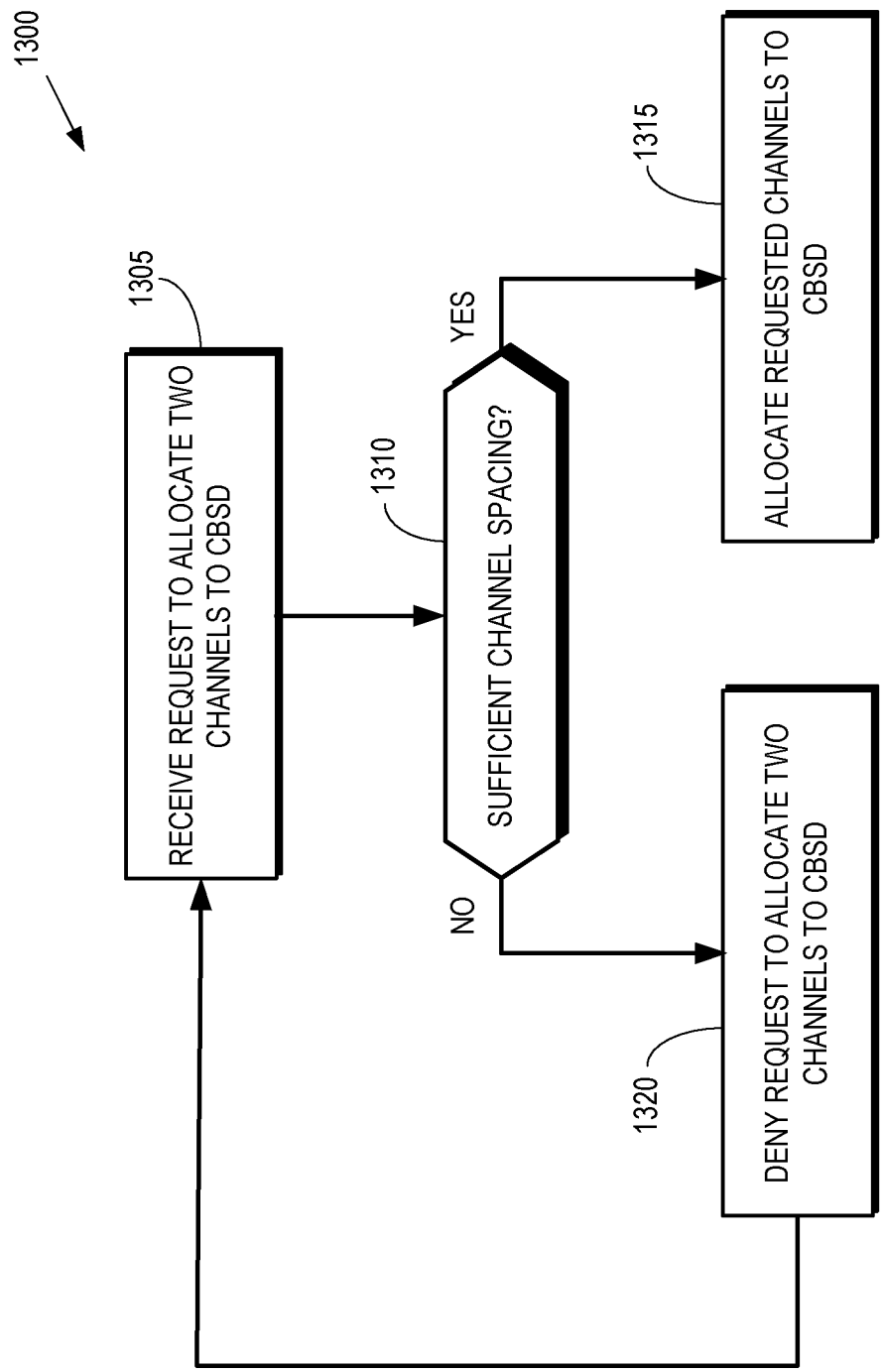
FIG. 13 is a flow diagram of a method of allocating widely spaced channels to support emergency calling in a DPA according to some embodiments.

FIG. 13 is a flow diagram of a method 1300 of allocating widely spaced channels to support emergency calling in a DPA according to some embodiments. At block 1305, an SAS receives a request to allocate two channels to a CBSD. The two channels include a primary channel and a secondary channel that is used as a backup in the event that an emergency call on the primary channel is disrupted by arrival of an incumbent. At decision block 1310, the SAS determines whether the frequency spacing of the two channels is sufficient to ensure that at least one of the two channels is available when an incumbent is present. If the spacing between the two channels is sufficiently wide, the method 1300 flows to the block 1315 and the SAS allocates the two channels. If the spacing between the two channels is not sufficiently wide, the method 1300 flows to the block 1320 and the SAS denies the requested allocation of the two channels. The method 1300 then flows back to the block 1305 so that the CBSD has an opportunity to request a different pair of channels.

Figure 14:
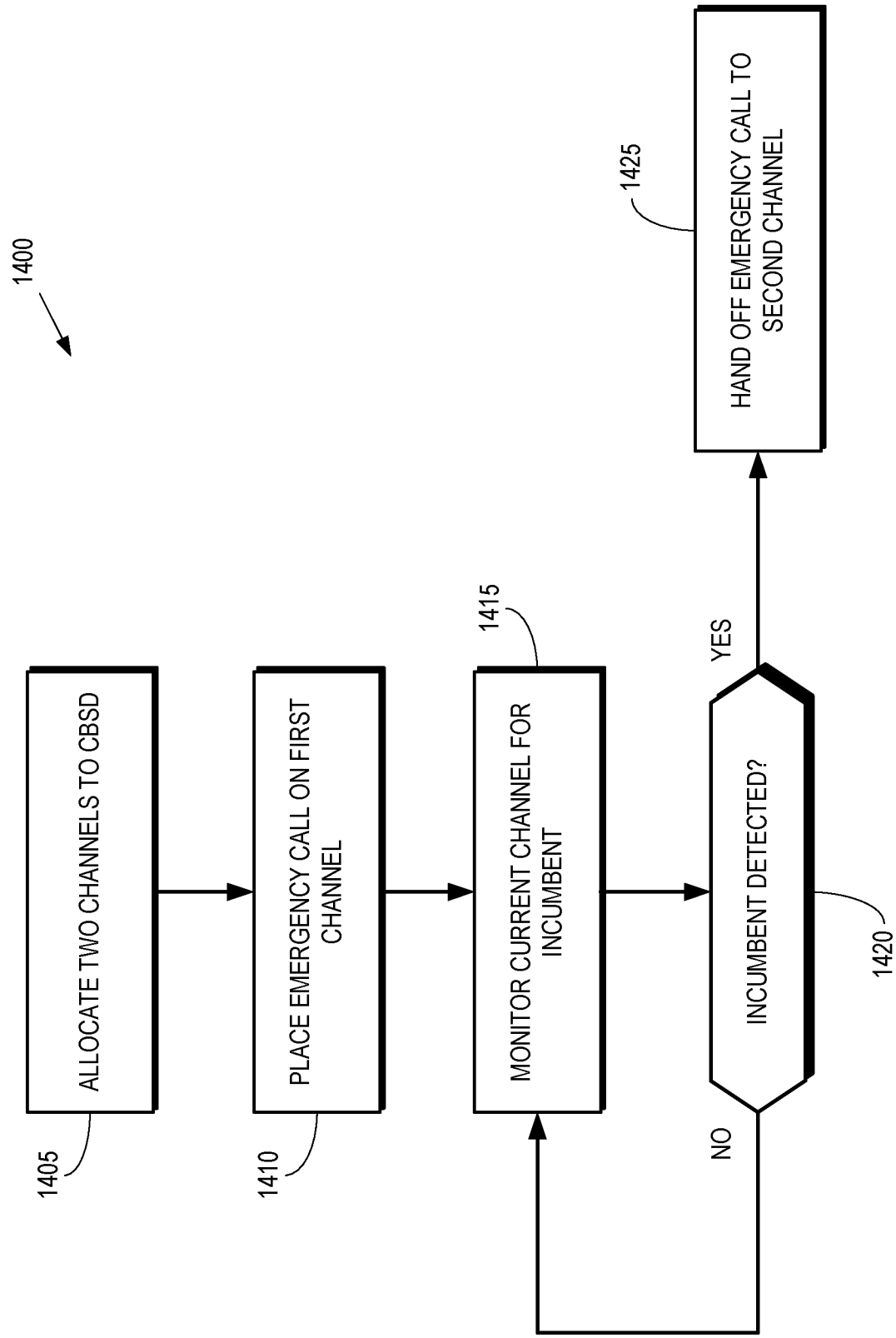
FIG. 14 is a flow diagram of a method of selectively handing off an emergency call in response to arrival of an incumbent according to some embodiments.

FIG. 14 is a flow diagram of a method 1400 of selectively handing off an emergency call in response to arrival of an incumbent according to some embodiments. At block 1405, an SAS allocates two channels to a CBSD to provide redundancy in the event that an incumbent arrives and disables one of the channels during an emergency call. In some embodiments, the SAS allocates the two channels according to the method 1300 shown in FIG. 13. At block 1410, an emergency call is placed by a user via the CBSD on one of the allocated channels. At block 1415, an ESC system monitors the channels to detect arrival of an incumbent. At decision block 1420, the ESC system determines whether an arriving incumbent has been detected. As long as no incumbent has been detected, the emergency call and monitoring continue at block 1415, 1420. If an incumbent is detected by the ESC system, the method 1400 flows to the block 1425 and the emergency call is handed off to the second channel allocated to the CBSD.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
   i. a combination of analog and/or digital hardware circuit(s) with software/firmware and
   ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A spectrum access system (SAS) comprising:
a transceiver configured to receive information indicating a path loss from an interior location of a structure to an exterior location in response to a first base station being installed at the interior location, the path loss being determined based on an observed signal strength at the exterior location concurrently with the transceiver transmitting at a maximum permitted power level; and
a processor configured to: determine an aggregate interference level for an incumbent proximate the exterior location based on the path loss, allocate at least one channel to the first base station based on the aggregate interference level, and allocate two carriers that are separated by a predetermined bandwidth associated with the incumbent so that the presence of the incumbent does not disable both carriers.

2. The SAS system of claim 1, wherein the maximum permitted power level is higher than a maximum permitted indoor power level that assumes a default path loss that is less than the path loss determined based on the observed signal strength at the exterior location.

3. The SAS system of claim 2, wherein the maximum permitted power level is 30 dBm and the default path loss is 15 dBm.

4. The SAS system of claim 1, wherein the transceiver is configured to provide wireless connectivity to the interior of the structure at up to the maximum permitted power level.

5. The SAS system of claim 4, wherein the first base station implements a contention-based media access control (MAC) layer to provide wireless connectivity to the interior of the structure.

6. The SAS system of claim 1, wherein the transceiver is configured to receive a request to allocate the two carriers, and wherein the processor is configured to selectively grant the request based on a comparison of a bandwidth between the two carriers and the predetermined bandwidth.

7. An apparatus comprising:
at least one processor; and
at least one memory including computer program code;

the at least one memory and the computer program code configured to, with the at least one processor, cause the apparatus at least to perform:

receiving information indicating a path loss from an interior location of a structure to an exterior location in response to a first base station being installed at the interior location;

determining an aggregate interference level for an incumbent proximate the exterior location based on the path loss;

allocating at least one channel to the first base station based on the aggregate interference level;

receiving a request to allocate at least two carriers to the first base station associated with a spectrum access server; and determining whether a frequency separation between the at least two carriers is larger than a bandwidth allocated to an incumbent.

8. The apparatus of claim 7, wherein the information indicating the path loss is determined based on an observed signal strength at the exterior location concurrently with the transceiver transmitting at a maximum permitted power level.

9. The apparatus of claim 8, wherein the maximum permitted power level is higher than a maximum permitted indoor power level that assumes a default path loss that is less than the path loss determined based on the observed signal strength at the exterior location.

10. The apparatus of claim 8, wherein the at least one memory and the computer program code are configured to, with the at least one processor, cause the apparatus at least to perform:

providing wireless connectivity to the interior of the structure at up to the maximum permitted power level.

11. The apparatus of claim 7, wherein the at least one memory and the computer program code are configured to, with the at least one processor, cause the apparatus at least to perform:

rejecting the request if the frequency separation is less than the bandwidth; and granting the request if the frequency separation is greater than or equal to the bandwidth.

12. A non-transitory computer readable storage medium having instructions stored thereon, the instructions, when executed by at least one processor, manipulate the at least one processor to perform:

receiving information indicating a path loss from an interior location of a structure to an exterior location in response to a first base station being installed at the interior location;

determining an aggregate interference level for an incumbent proximate the exterior location based on the path loss;

allocating at least one channel to the first base station based on the aggregate interference level;

receiving a request to allocate at least two carriers to the first base station; and determining whether a frequency separation between the at least two carriers is larger than a bandwidth allocated to an incumbent.

* * * * *